US011500319B2

(12) United States Patent
Nishimura

(10) Patent No.: US 11,500,319 B2
(45) Date of Patent: Nov. 15, 2022

(54) IMAGE READING DEVICE AND IMAGE FORMING APPARATUS

(71) Applicant: SHARP KABUSHIKI KAISHA, Osaka (JP)

(72) Inventor: Toshiki Nishimura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/488,044

(22) Filed: Sep. 28, 2021

(65) Prior Publication Data

US 2022/0107597 A1 Apr. 7, 2022

(30) Foreign Application Priority Data

Oct. 5, 2020 (JP) .............................. JP2020-168147

(51) Int. Cl.
*H04N 1/00* (2006.01)
*G03G 21/00* (2006.01)
*G03G 15/00* (2006.01)

(52) U.S. Cl.
CPC ....... *G03G 15/602* (2013.01); *G03G 15/6511* (2013.01); *G03G 15/6529* (2013.01)

(58) Field of Classification Search
None
See application file for complete search history.

(56) References Cited

U.S. PATENT DOCUMENTS

2002/0067939 A1* 6/2002 Hamada ............. H04N 1/00602
399/367

FOREIGN PATENT DOCUMENTS

| DE | 102016116728 A1 * | 3/2017 | ............. G03G 15/00 |
| EP | 3376747 A1 * | 9/2018 | ............... B65H 1/04 |
| JP | 0573022 A2 * | 12/1993 | |
| JP | 2003-228141 A | 8/2003 | |

* cited by examiner

*Primary Examiner* — Jill E Culler
*Assistant Examiner* — Ruben C Parco, Jr.
(74) *Attorney, Agent, or Firm* — ScienBiziP, P.C.

(57) ABSTRACT

An image reading device includes a reading device body and a document feeder that is turnably attached on the upper side of the reading device body with hinge devices. An extended portion that extends outward from a rear frame is formed on a beam frame fixing the rear frame and a front frame of the document feeder at a predetermined interval, and a third coupling portion coupled to the turning member of the hinge device is formed in the extended portion.

8 Claims, 13 Drawing Sheets

RIGHT ← → LEFT

IMAGE READING DEVICE AND IMAGE FORMING APPARATUS

BACKGROUND OF THE INVENTION

Field of the Invention

This invention relates to an image reading device and an image forming apparatus, and in particular, for example, to an image reading device and an image forming apparatus, wherein a document feeder is turnably attached to the upper side of the reading device body having an image device section using a hinge device.

Description of the Background Art

Japanese Unexamined Patent Publication No. 2003-228141 discloses an example of a known image forming apparatus. The image forming apparatus of JP 2003-228141 includes a document transporter (document feeder), an image reader (reading device body), a frame of the document transporter, a panel to which the frame and a transporting drive system are attached, and a hinge (hinge device) that allows the document transporter to be opened and closed relative to the image reader. The hinge includes a fixed member that is fixed to the image reader and a movable member (turning member) that supports the document transporter. With the technique of JP 2003-228141, the frame and a hinge mounting plate to which the hinge is attached are attached to the panel. A strength arm is attached to the hinge mounting plate, and the strength arm is coupled to the part of the panel to which the frame is attached.

The hinge device that turnably couples the document feeder to the reading device body includes an urging mechanism that exerts an urging force in a direction in which the turning member opens relative to the fixed member (that is, the document feeder relative to the reading device body). This prevents the document feeder from slamming shut by its own weight when the document feeder is closed, and enables the document feeder to be opened with a small force. In the image reading device including the hinge device including such an urging mechanism, the urging mechanism causes a force to constantly act in the opening direction (upward direction) relative to the document feeder.

With the technique of JP 2003-228141, the turning member of the hinge device is attached to one of the two side frames (the rear frame) of the document feeder, and thus the urging force of the urging mechanism acts more on the side frame to which the turning member is attached than on the other side frame (the front frame). This causes distortion between the two side frames positioned across the center of gravity of the document feeder (in other words, one side frame tilts relative to the other side frame), and the parallelism of the multiple transport rollers supported by the two side frames is shifted, which may cause skewed feeding of the document. To prevent such distortion between the front frame and the rear frame, the front frame and the rear frame must be firmly fastened with many more fastening members, which may result in an increase in the weight of the document feeder. This increase in the weight of the document feeder leads to an increase in the urging force of the urging mechanism, which causes a need to reinforce the document feeder. As a result, there is a risk of causing an increase in the size of the document feeder.

Therefore, a main object of the present invention is to provide a novel image reading device and an image forming apparatus.

Another object of the present invention is to provide, in a simple configuration, an image reading device and an image forming apparatus capable of maintaining parallelism of multiple transport rollers and preventing skewed feeding of a document.

SUMMARY OF THE INVENTION

According to a first aspect, an image reading device includes a reading device body including an image reader; and a document feeder turnably attached to an upper side of the reading device body with a hinge device, wherein, the document feeder includes a plurality of transport rollers disposed in a document transport path; a planar first side frame that rotatably supports one end of the transport rollers; a planar second side frame disposed parallel to the first side frame and rotatably supports the other end of the transport rollers; and a beam frame disposed at a position corresponding to the hinge device to fix the first side frame and the second side frame at a predetermined interval, and the hinge device includes a fixed member fixed to the reading device body; a turning member turnably, coupled to the fixed member around a support shaft and coupled to the first side frame to support the document feeder; and an urging mechanism that exerts an urging force to the fixed member in the direction of opening of the turning member. The beam frame includes a beam body having a first coupling portion and a second coupling portion, the first coupling portion being coupled to the first side frame, the second coupling portion being coupled to the second side frame, the beam body being bridged between the first side frame and the second side frame; an extended portion that extends from one end of the beam body to outside of the first side frame; and a third coupling portion formed in the extended portion and coupled to the turning member.

According to a first aspect, the extended portion is formed in the beam frame, which fixes the first side frame and the second side frame at a predetermined interval, and the extended portion is fixed to the turning member of the hinge device. This allows the urging force of the urging mechanism to act similarly on both the first side frame and the second side frame, thereby increasing the frame rigidity and appropriately preventing distortion between the first side frame and the second side frame. Accordingly, the parallelism of the transport rollers can be maintained with a simple configuration, and the skewed feeding of a document can be prevented.

According to a second aspect dependent on the first aspect, the beam body may have a bottom wall and a first longitudinal wall rising from one side edge of the bottom wall, and the extended portion may extend from one end of the first longitudinal wall.

According to a second aspect, the extended portion is extended from the first longitudinal wall, that is, the extended portion is formed in the shape of a longitudinal wall, and thus the bending strength. (rigidity) of the extended portion in the vertical direction can be increased.

According to a third aspect dependent on the first or second aspect, the vertical length of the first longitudinal wall may be the same over substantially the entire length in the longitudinal direction, and the vertical length of the extended portion may be the same as the vertical length of the first longitudinal wall over substantially the entire length in the longitudinal direction.

According to a third aspect, the first longitudinal wall and the extended portion are formed to have a constant vertical length over substantially the entire length in the longitudinal direction, and thus the bending strength of the entire beam frame in the vertical direction can be increased.

According to a fourth aspect dependent on any one of the first to third aspects, the turning member may include a holding member that holds the urging mechanism; and a frame fixing member that is attached to the outer face of the holding member, the first side frame may include a longitudinal plate-shaped first side frame body having a first insertion portion through which the extended portion is inserted; and a transverse plate-shaped oppositely extending portion extending outward from the lower end of the first side frame body and having a second insertion portion through which the frame fixing member is inserted, and the frame fixing member may be fixed to the third coupling portion and the oppositely extending portion.

According to a fifth aspect dependent on the fourth aspect, the beam body may have a bottom wall, a first longitudinal wall rising from one side edge of the bottom wall, and a second longitudinal wall rising from the other side edge of the bottom wall portion, the frame fixing member may have a top wall and two side walls extending downward from two side edges of the top wall, the bottom wall of the beam body may be disposed within a height range of the two side walls of the frame fixing member, and the first side frame body may be sandwiched and fixed between the beam body and the frame fixing member.

According to the fifth aspect, the bending strength in the vertical direction of the coupling portion between the beam body of the beam frame, the first side frame, and the frame fixing member of the hinge device can be increased.

According to a sixth aspect dependent on any one of the first to fifth aspects, the beam frame may be disposed at an end adjacent to the transport rollers in the longitudinal direction of the first side frame.

According to the sixth aspect, the frame rigidity of the portion holding the transport rollers can be effectively increased, so that the distortion between the two side frames can be more appropriately suppressed.

According to a seventh aspect dependent on any one of the first to sixth aspects, the document feeder may include a second image reader, and the reading sensor of the second image reader may be fixed on the beam body.

According to a seventh aspect, there is no need for a separate fixing frame for fixing the reading sensor, and the weight of the document feeder can be reduced.

According to an eighth aspect, an image forming apparatus includes the image reading device according to any one of the first to the seventh aspects.

According to the eighth invention, the same effects as those of any of the first to seventh aspects are achieved, the parallelism of the transport rollers can be maintained with a simple configuration, and skewed feeding of a document can be prevented.

According to an aspect, the extended portion is formed in the beam frame, which fixes the first side frame and the second side frame at a predetermined interval, and the extended portion is fixed to the turning member of the hinge device. This allows the urging force of the urging mechanism to act similarly on both the first side frame and the second side frame, thereby increasing the frame rigidity and appropriately preventing distortion between the first side frame and the second side frame. Accordingly, the parallelism of the transport rollers can be maintained with a simple configuration, and the skewed feeding of a document can be prevented.

The above-described objects, other objects, features and advantages of the present invention will become more apparent from the detailed descriptions of the following embodiments given with reference to the drawings.

DESCRIPTION OF THE PREFERRED EMBODIMENTS

First Embodiment

Figure 1:
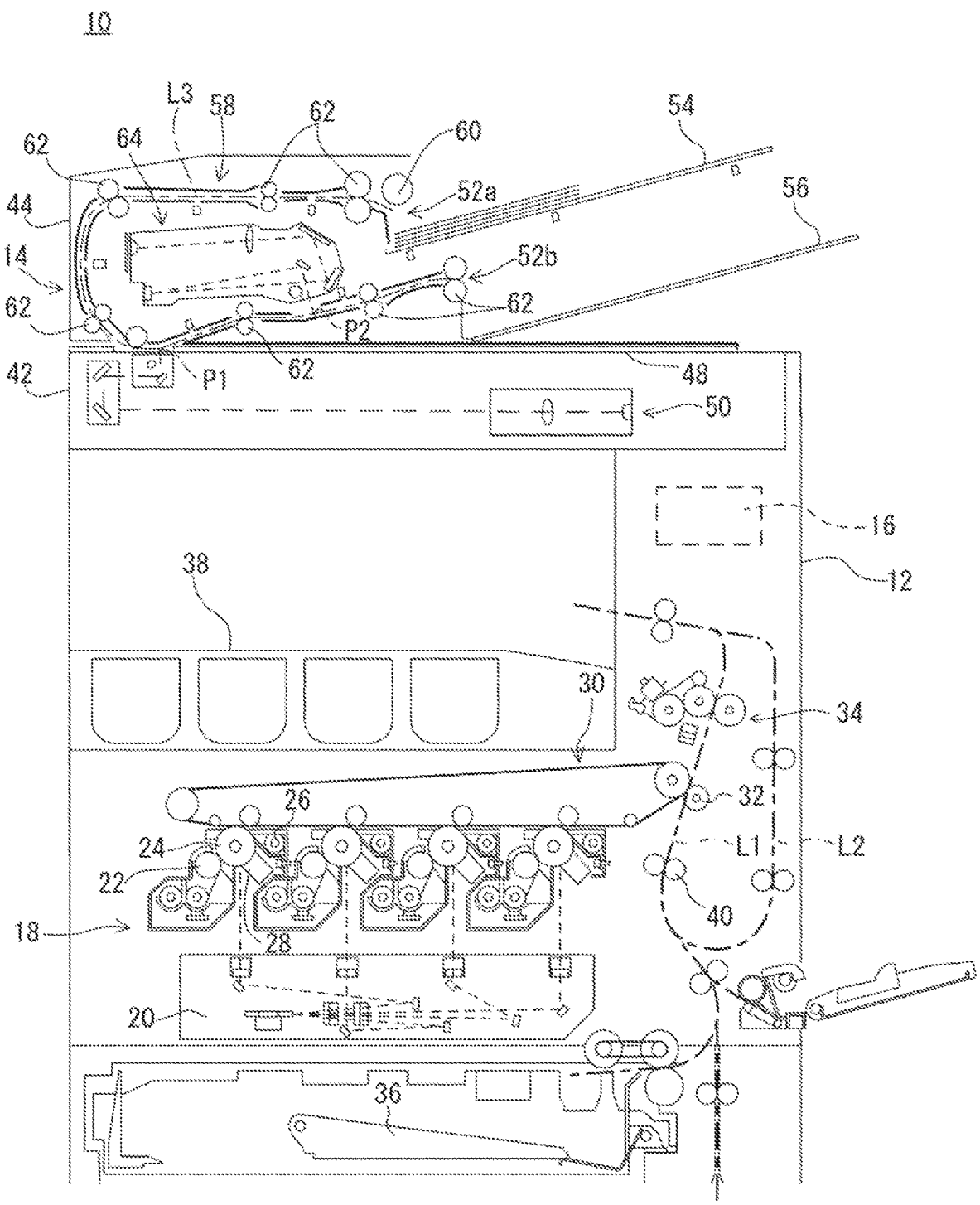
FIG. 1 is a schematic cross-sectional view of the internal structure of an image forming apparatus including an image reading device according to a first embodiment of the present invention.

With reference to FIG. 1, an image reading device 14 of a first embodiment of the present invention includes a reading device body 42 and a document feeder 44 that can be opened and closed relative to the reading device body 42. The image reading device 14 is used in an image forming apparatus 10 that forms images on sheets by an electrophotographic method.

The basic configuration of the image forming apparatus 10 will now be briefly described. Note that in this specification, the front-back direction. (depth direction) of the image forming apparatus 10 and its components are defined such that the surface facing the user's standing position, that is, the surface on the side to which the operation panel (not illustrated) is disposed is the forward surface (front surface). The left-right direction (transverse directions) of the image forming apparatus 10 and its components are defined with reference to the state in which the image forming apparatus 10 is viewed from a user.

As illustrated in FIG. 1, the image forming apparatus 10 is a multifunction peripheral MT) having a copy function, a printer function, a scanner function, a facsimile function, etc., and includes an image forming apparatus body 12 and the image reading device 14 disposed on the same.

The image forming apparatus body 12 incorporates a control unit 16 including a CPU and memory, an image former 18, etc. The control unit 16 transmits control signals to each part of the image forming apparatus 10 including the image reading device 14 in response to input operation to an operation panel, and causes the image forming apparatus 10 to perform various operations. That is, the control unit 16 is also the control unit for the reading device body 42 and the document feeder 44.

The image former 18 includes an exposure unit 20, a developing unit 22, a photoreceptor drum 24, a cleaner unit 26, a charging unit 28, an intermediate transfer belt unit 30, a transfer roller 32, and a fixing unit 34. The image former 18 forms an image on a sheet transported from a sheet feeding tray 36 or the like and outputs an image-formed sheet into a sheet output tray 38. The image data for forming an image on a sheet is image data read by a first image reader 50 and a second image reader 64, which are described below, image data sent from an external computer, or the like.

Note that the image data handled by the image forming apparatus 10 correspond to the four colors of black (K), cyan (C), magenta (M), and yellow (Y) of a color image. Therefore, the developing unit 22, the photoreceptor drum 24, the cleaner unit 26, and the charging unit 28 are provided for every color so that four types of latent images corresponding to four colors are formed, whereby these constitute four image stations.

In the housing of the image forming apparatus body 12, a first sheet transport path L1 is formed for transporting a sheet from the sheet feeding tray 36 to the sheet output tray 38 via a registration roller 40, the transfer roller 32, and the fixing unit 34. There is also formed a second sheet transport path L2 for returning the sheet that has passed through the fixing unit 34 after one side of the sheet is printed to the first sheet transport path L1 at the upstream side of the transfer roller 32 in a sheet transport direction in order to perform a duplex printing on the sheet. In the first sheet transport path L1 and the second sheet transport path L2, there are disposed a plurality of transport rollers to provide auxiliary propulsion to the sheet as appropriate.

Figure 4:
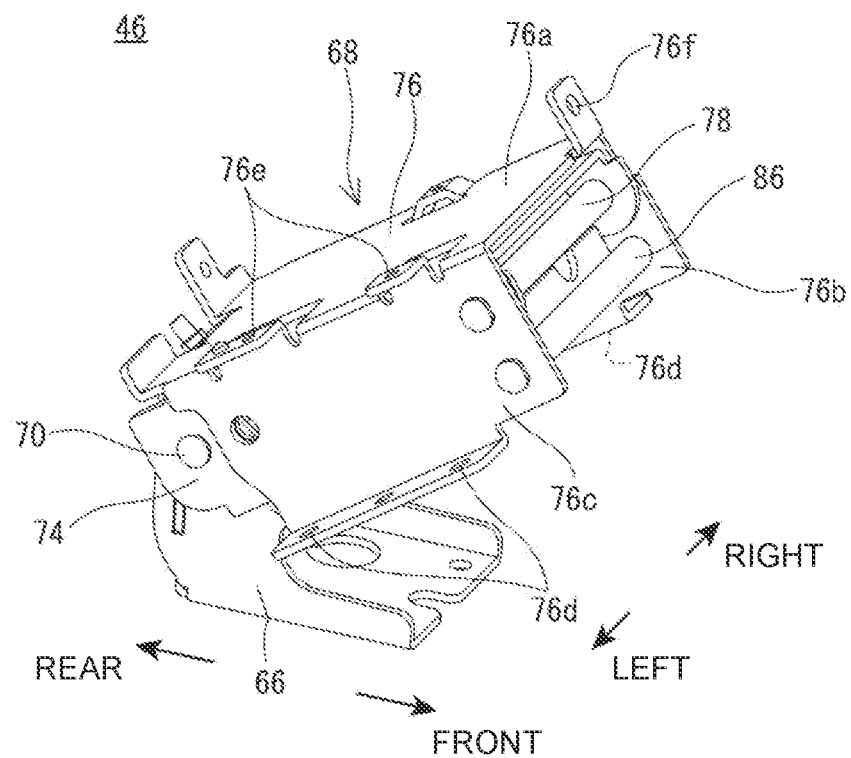
FIG. 4 is a perspective view of the appearance of a hinge device of the image reading device.

The image reading device 14 includes the reading device body 42 and the document feeder 44 that is turnably attached on the upper side of the reading device body 42 with hinge devices 46 (see FIG. 4). The document feeder 44 is also used as a document press cover. An operation panel that receives input operations such as printing instructions by a user is disposed on the front side of the reading device body 42. The operation panel is appropriately provided with a display with a touch screen, operation buttons, etc.

The housing of the reading device body 42 has a document placing table 48 made of a transparent material on the upper surface. The housing accommodates the first image reader 50 for reading an image on the document face. The first image reader 50 includes a light source, multiple mirrors, an imaging lens, and a reading sensor (line sensor). The light source, the mirrors, etc., constitute a scanning unit. The first image reader 50 exposes the document face with light from the light source, and guides the light reflected from the document face to the imaging lens via the mirrors. The reflected light is imaged on the light receiving element of the reading sensor by the imaging lens. The reading sensor detects the luminance and the chromaticity of the reflected light forming an image on the light receiving element, thereby generating image data based on the image on the document face. The reading sensor may be a charge coupled device (CCD), a contact image sensor (CIS), or the like.

The first image reader 50 supports fixed image reading in which an image of a document placed on the document placing table 48 is read, moving image reading in which an image of a document being transported by the document feeder 44 is read. That is, in the case of fixed reading, the scanning unit including the light source, the mirrors, etc., reciprocates in the sub-scanning direction below the document placing table 48 to read an image of the document on the side adjacent to the document placing table 48. In the case of moving reading, the scanning unit waits below a first image reading position P1 or home position. The first image reader 50 then reads an image on the front face (the face adjacent to the first image reader 50) of the document when the document transported by the document feeder 44 passes through the first image reading position P1.

Figure 2:
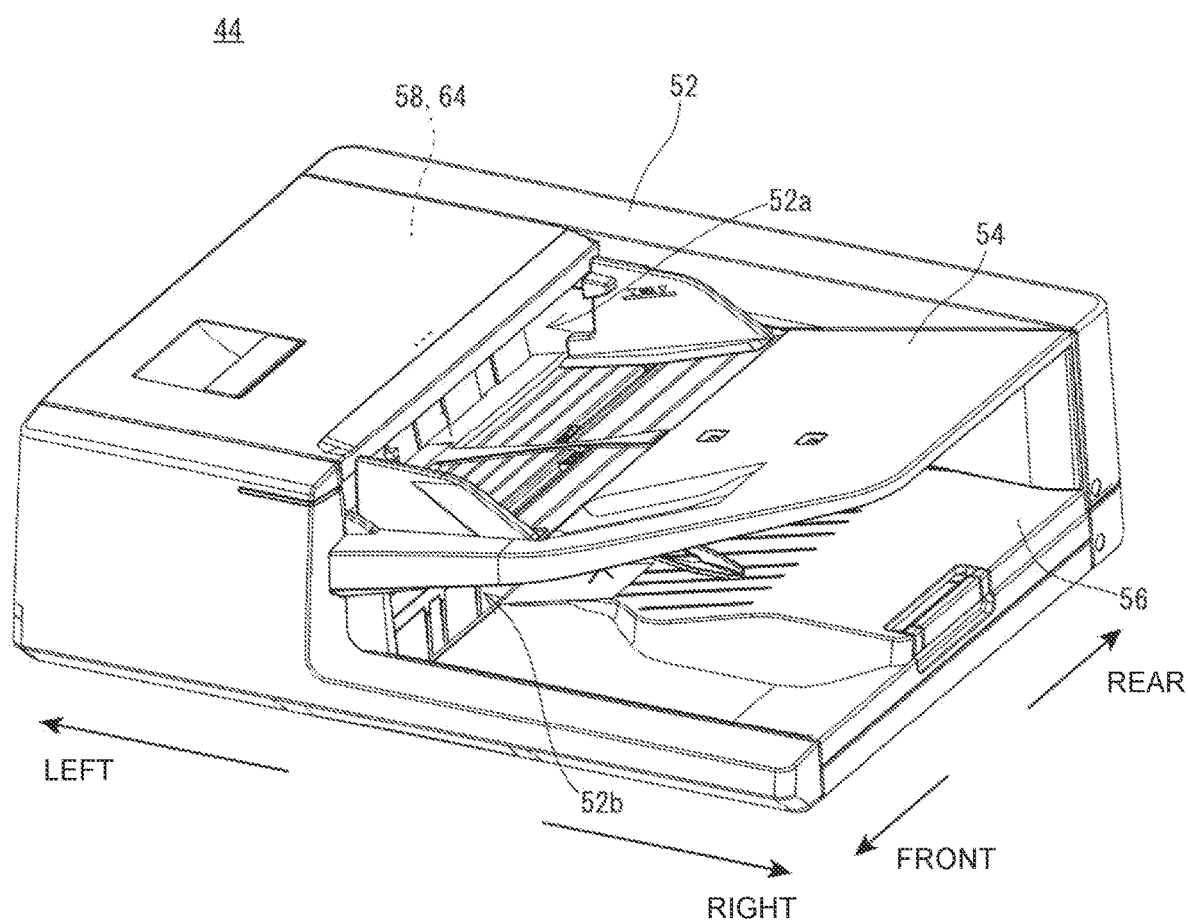
FIG. 2 is a perspective view of the appearance of a document feeder of the image reading device.
Figure 3:
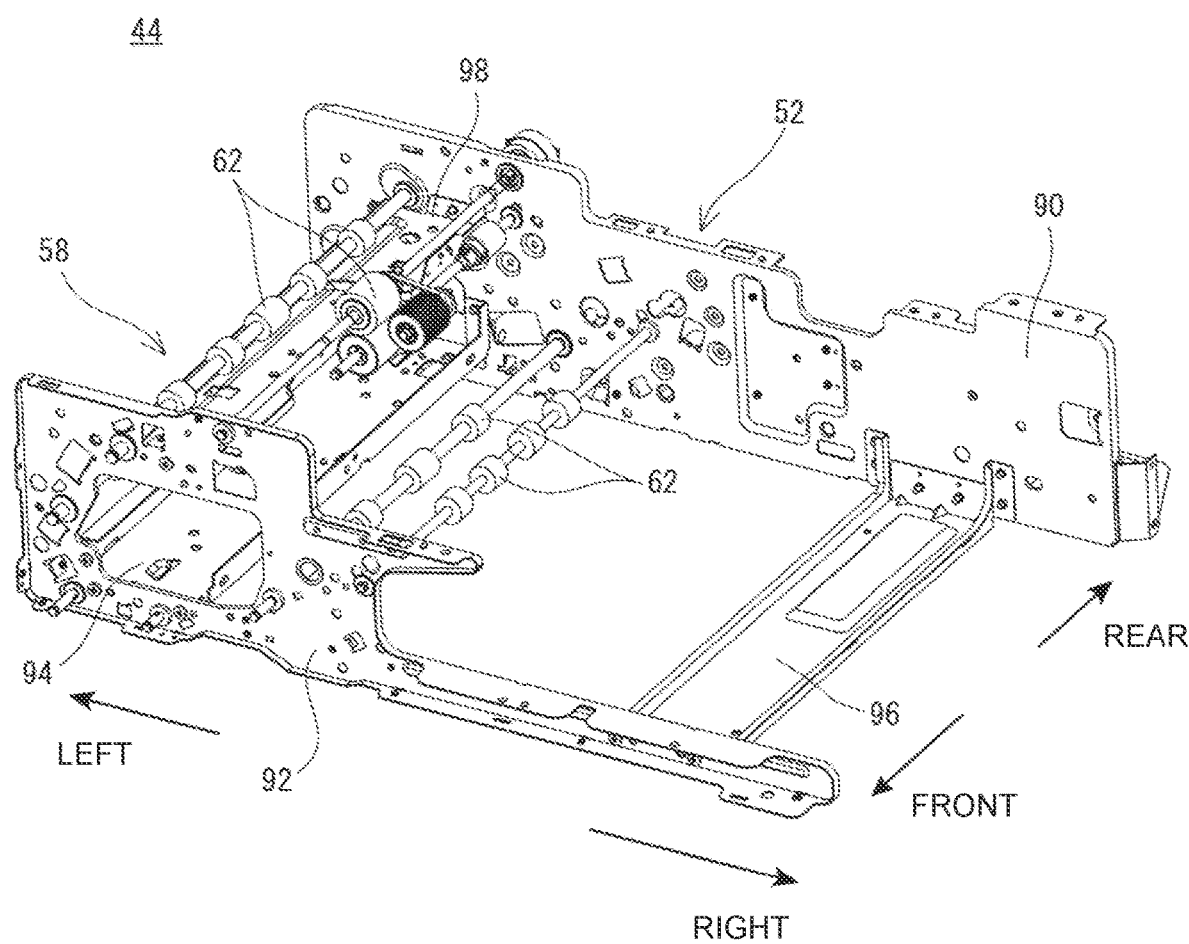
FIG. 3 is a perspective view of the frame structure of the document feeder.

Referring to FIGS. 2 and 3 together with FIG. 1, the document feeder 44 is an automatic document feeder (ADF) capable of automatically and continuously feeding a document one by one, and includes a housing 52. The housing 52 includes a frame that defines the framework of the housing 52 and an exterior member that covers an outer face of the frame. As will be described below, the frame of the housing 52 includes two side frames 90 and 92 (a rear frame 90 and a front frame 92) and multiple beam frames 94, 96, and 98 (a left beam frame 94, a right beam frame 96, and an upper left beam frame 98).

In the upper central area of the housing 52, a sheet feed opening 52a is formed and a document loading tray 54 extends diagonally to the upper right from the sheet feed opening 52a. In the lower central area of the housing 52, a sheet output opening 52b is formed and a document output tray 56 extends diagonally to the upper right from the sheet output opening 52b. In the left side portion of the housing 52, a document transport path L3 extends in a U-shape from the sheet feed opening 52a to the sheet output opening 52b along the outer circumference face of the second image reader 64 described below. A document feed mechanism 58 is disposed in the document transport path L3. That is, the document feed mechanism 58 is disposed in the left portion of the document feeder 44.

The document feed mechanism 58 includes a pickup roller 60 and multiple transport rollers 62. The document feed mechanism 58 transports a document loaded on the document loading tray 54 to the document output tray 56 after the document passes through the first image reading position P1 and a second image reading position P2 described below. The transport rollers 62 includes a sheet feed roller disposed at the upstream end of the document transport path L3, a registration roller that is disposed upstream of the first image reading position P1 to adjust the sheet feeding timing, and a sheet output roller disposed at the downstream end of the document transport path L3. The transport rollers 62 are rotatably supported by the side frames 90 and 92. Note that FIG. 3 illustrates some of the transport rollers 62 in addition to the frame structure of the document feeder 44.

The housing 52 of the document feeder 44 includes two side frames 90 and 92: a planar rear frame 90 disposed at the rear side and a planer front frame 92 disposed parallel to the rear frame 90 at the front side. The rear frame 90 rotatably supports one end (rear end) of the transport rollers 62, and the front frame 92 rotatably supports the other end (front end) of the transport rollers 62. A motor that rotates the transport rollers 62, etc., is appropriately disposed on the rear face of the rear frame 90.

The housing 52 includes multiple beam frames 94, 96, and 98, that is, a left beam frame 94, a right beam frame 96 and an upper left beam frame 98, that fix the rear frame 90 and the front frame 92 at a predetermined interval in the front-back direction. The left beam frame 94 is disposed at the left end of the rear frame 90 and the front frame 92. That is, the left beam frame 94 is disposed at the end of the rear frame 90 adjacent to the transport rollers 62 in the longitudinal direction. Specifically, the left beam frame 94 is disposed at a position corresponding to the left hinge device 46 described below (see FIG. 10), The right beam frame 96 is disposed at the right end of the rear frame 90 and the front frame 92, which is a position corresponding to the right hinge device (not illustrated). The upper left beam frame 98 is positioned above the left beam frame 94.

In the first embodiment, the document feeder 44 includes a second image reader 64 for reading an image on the back side of a document. Similar to the first image reader 50, the second image reader 64 includes a light source, multiple mirrors, an imaging lens, and a reading sensor 64*a* (see FIG. 12). These components are arranged in the housing 52 in a unitary state. The second image reader 64 corresponds to moving reading in which the image of the document; being transported by the document feeder 44 is read. That is, in the case where the user requests double-sided reading of a document, as the document being transported by document feeder 44 passes through the second image reading position P2; the second image reader 64 reads the image on the back side of the document (adjacent to the second image reader 64).

The document feeder 44 is mounted to the upper face of the housing of the reading device body 42 in an openable manner with one or more hinge devices. The image reading device 14 of the first embodiment includes a left hinge device 46 disposed at the left, end of the rear side (back side) and a right hinge device disposed at the right end of the rear side. That is, the document feeder 44 can be freely opened and closed so that the front side moves up and down with the left and right hinge devices disposed on the rear side serving as opening and closing fulcrums.

The configuration of the hinge devices will now be briefly described with reference to FIGS. 4 and 5. Since the left and right hinge devices may have the same basic configuration, the configuration of the left hinge device 46 will be described here as a representative example. However, the configuration of the left hinge device 46 (as well as the right hinge device) described here is merely an example, and the specific configuration thereof can be changed as appropriate. The configuration of the frame fixing member 76 is different between the left hinge device 46 and the right hinge device.

Figure 5:
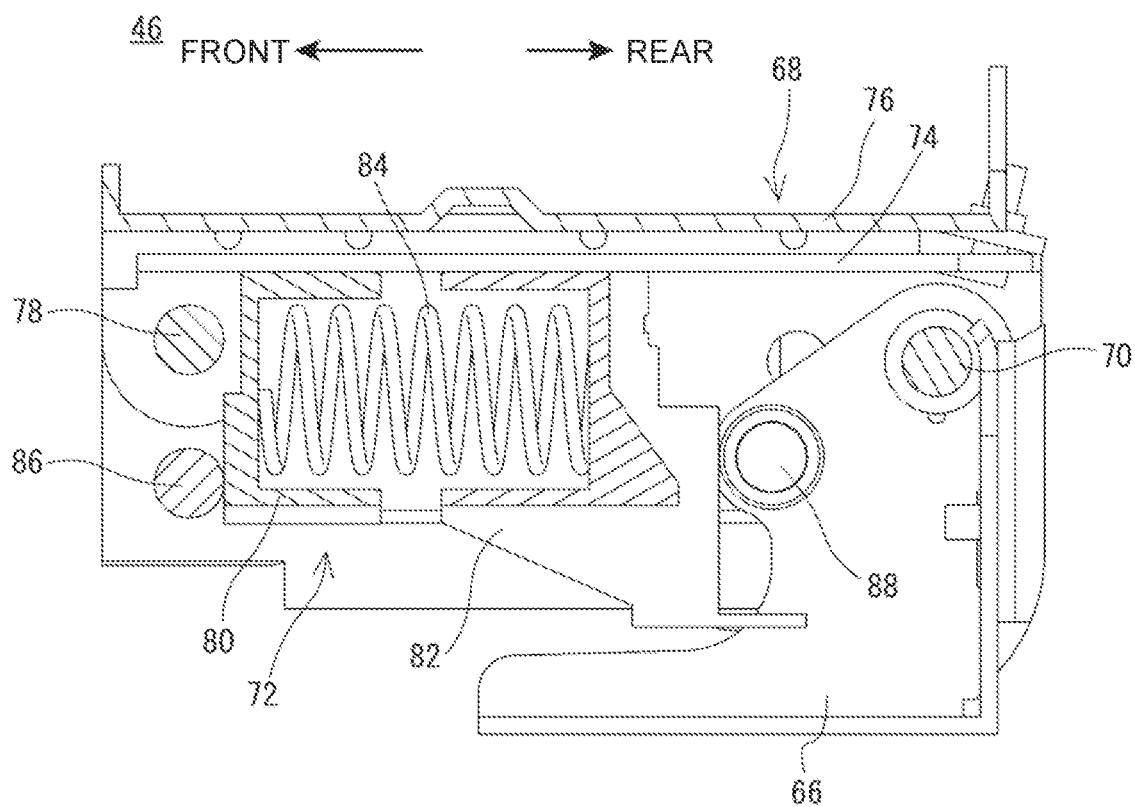
FIG. 5 is a cross-sectional view of the internal structure of the hinge device.

As illustrated in FIGS. 4 and 5, the left hinge device 46 includes a fixed member 66 that is fixed to the frame of the reading device body 42 and a turning member 68 that supports the document feeder 44. The turning member 68 is turnably connected to the fixed member 66 around a support shaft 70. An urging mechanism 72 that exerts an urging force on the fixed member 66 in the direction of opening of the turning member 68 is disposed on the turning member 68. Thus, an urging force is exerted on the document feeder 44 in a direction in which the document feeder 44 opens relative to the reading device body 42.

Specifically, the turning member 68 includes a holding member 74 that holds the urging mechanism 72 including two spring holders 80 and 82 and a coil spring 84, and a frame fixing member 76 disposed so as to cover the outer surface of the holding member 74. The holding member 74 is turnably coupled to the fixed member 66 via a support shaft 70 (hinge pin) disposed at the proximal end of the holding member 74. The frame fixing member 76 is coupled to the holding member 74 by a coupling shaft 78 disposed at the distal end of the frame fixing member 76. The frame fixing member 76 is coupled to the frame of the housing 52 of the document feeder 44. The specific configuration of the frame fixing member 76 will be described below.

In the holding member 74, the two spring holders 80 and 82, namely, a first spring holder 80 and a second spring holder 82, are slidably disposed in the front-back direction, and the coil spring 84 is held in a compressed state by the first spring holder 80 and the second spring holder 82. The coil spring 84 exerts an urging force on the first spring holder 80 and the second spring holder 82 in a direction that causes them to move away from each other. A first holder stopper 86 is disposed at the distal end of the frame fixing member 76 on the lower side of the coupling shaft 78, and a second holder stopper 88 is disposed on the fixed member 66 on the diagonally lower side of the support shaft 70.

Thus, an urging force from the coil spring 84 acts on the first holder stopper 86 (and thus on the turning member 68) in the forward direction via the first spring holder 80. An urging force from the coil spring 84 acts on the second holder stopper 88 (and thus on the fixed member 66) in the rearward direction via the second spring holder 82. Since the second holder stopper 88 is disposed at a diagonally downward distance from the support shaft 70, an urging force acts on the turning member 68 in the direction of opening relative to the fixed member 66. The urging force acts most significantly when the document feeder 44 is closed.

Here, in a conventional image reading device, the frame fixing member of the hinge device is fixed to the rear frame of the document feeder. Therefore, the urging force of the urging mechanism acts more on the rear frame than on the front frame. Since the urging force of the urging mechanism acts even in the state where the document feeder is closed, there is a risk that in the conventional image reading device, distortion may occur between the two side frames disposed across the center of gravity of the document feeder, and the parallelism of the multiple transport rollers may be shifted, causing the fed document to be skewed.

Therefore, in the first embodiment, an extended portion 132 is formed in the left beam frame 94 (an example beam frame) to prevent skewed feeding of the document caused by the distortion between the two side frames 90 and 92, and the extended portion 132 is coupled (fixed) to the frame fixing member 76 of the left hinge device 46 (an example hinge device). That is, the left beam frame 94 is integrated with the left hinge device 46, and the rear frame 90 and the front frame 92 are coupled to the left beam frame 94 to form a mounting structure constituting a single frame body, so that the frame rigidity can be increased even with a small amount of material.

The mounting structure of the document feeder 44 to the left hinge device 46 will now be described in detail. As described above, the document feeder 44 has a rear frame 90 (an example first side frame), a front frame 92 (an example second side frame) disposed parallel to the rear frame 90, and a left beam frame 94 that fixes the rear frame 90 and the front frame 92 at a. predetermined interval (see FIG. 3). The left beam frame 94 is disposed at the left end, which is a position corresponding to the left hinge device 46 and an end adjacent to the transport rollers 62.

Figure 6:
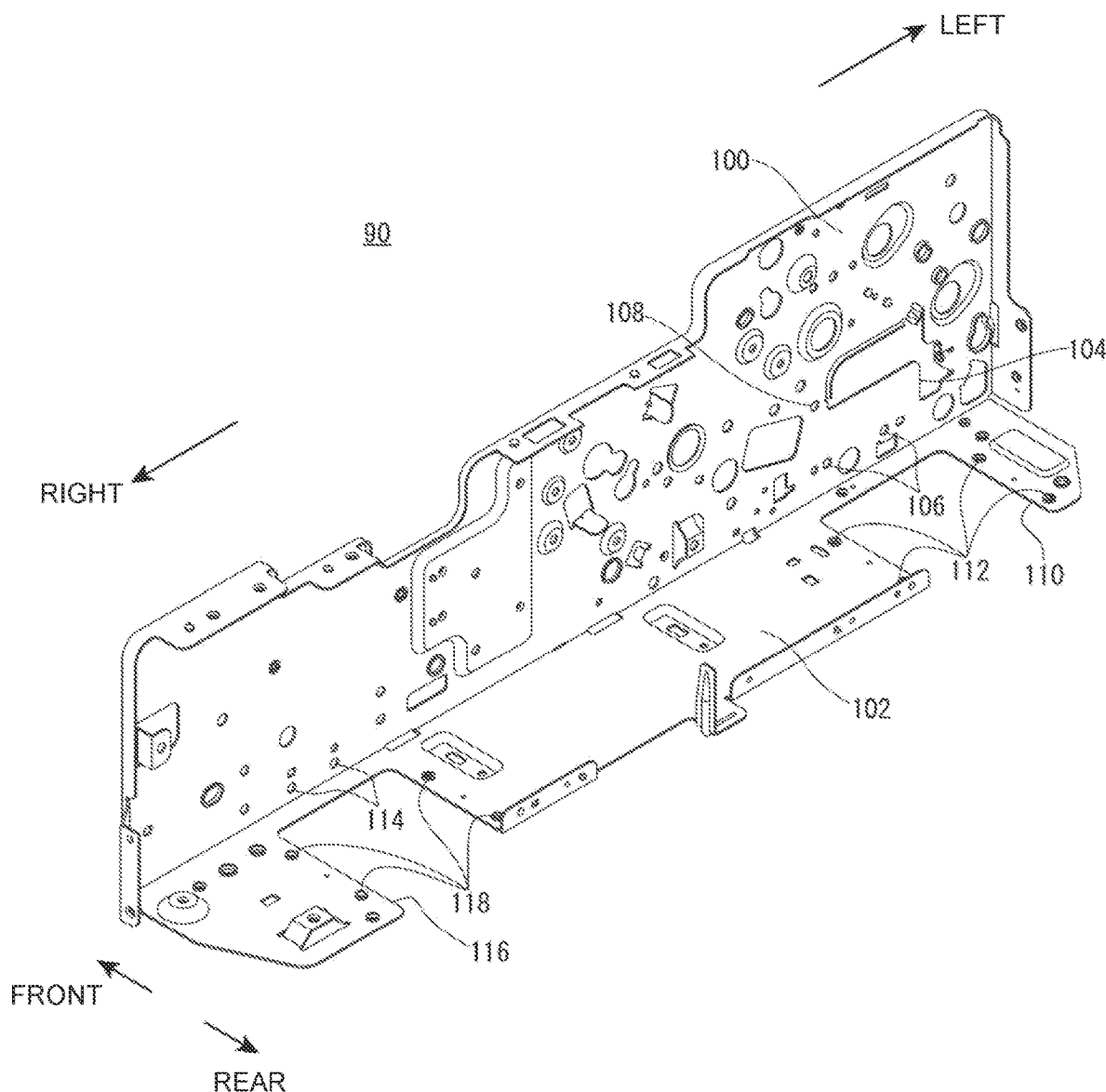
FIG. 6 is a perspective view of a rear frame.

As illustrated in. FIG. 6, the rear frame 90 includes a longitudinally planar rear frame body 100 and a transversely planar oppositely extending portion 102 extending outward (to rear side) from a lower end of the rear frame body 100.

A first insertion portion 104 is formed at the left end of the rear frame body 100, through which the extended portion 132 of the left beam frame 94 is inserted. First fixing portions 106 and a second fixing portion 108 are formed at the left, end of the rear frame body 100 on the lower side of the first insertion portion 104, The first fixing portions 106 are portions that are coupled to first coupling portions 140 of the left beam frame 94 with screw members (fastening members) and each has an insertion hole through which the fastening member is inserted. The second fixing portion 108 is a portion that is coupled to a fourth coupling portion 146 of the left beam frame 94 and a third support portion 76f of the frame fixing member 76 with a screw member and has an insertion hole through which the screw member is inserted.

A second insertion portion 110 is formed at the left end of the oppositely extending portion 102, through which the frame fixing member 76 is inserted. Third fixing portions 112 are formed at the left end of the oppositely extending portion 102 on the two sides of the second insertion portion 110. The third fixing portions 112 are portions coupled to first support portions 76d of the frame fixing member 76 with a screw member, and each has a threaded hole to be screwed with the screw member.

Fourth fixing portions 114 are formed at the right end of the rear frame body 100 to be coupled to the right beam frame 96. A third insertion portion 116 through which the frame fixing member of the right hinge device is inserted and fifth fixing portions 118 coupled to the frame fixing member of the right hinge device are formed at the right end of the oppositely extending portion 102. The rear frame body 100 also has a fixing portion coupled to the upper left beam frame 98 and a bearing portion through which the shafts of the transport rollers 62 are inserted, as appropriate.

Figure 7:
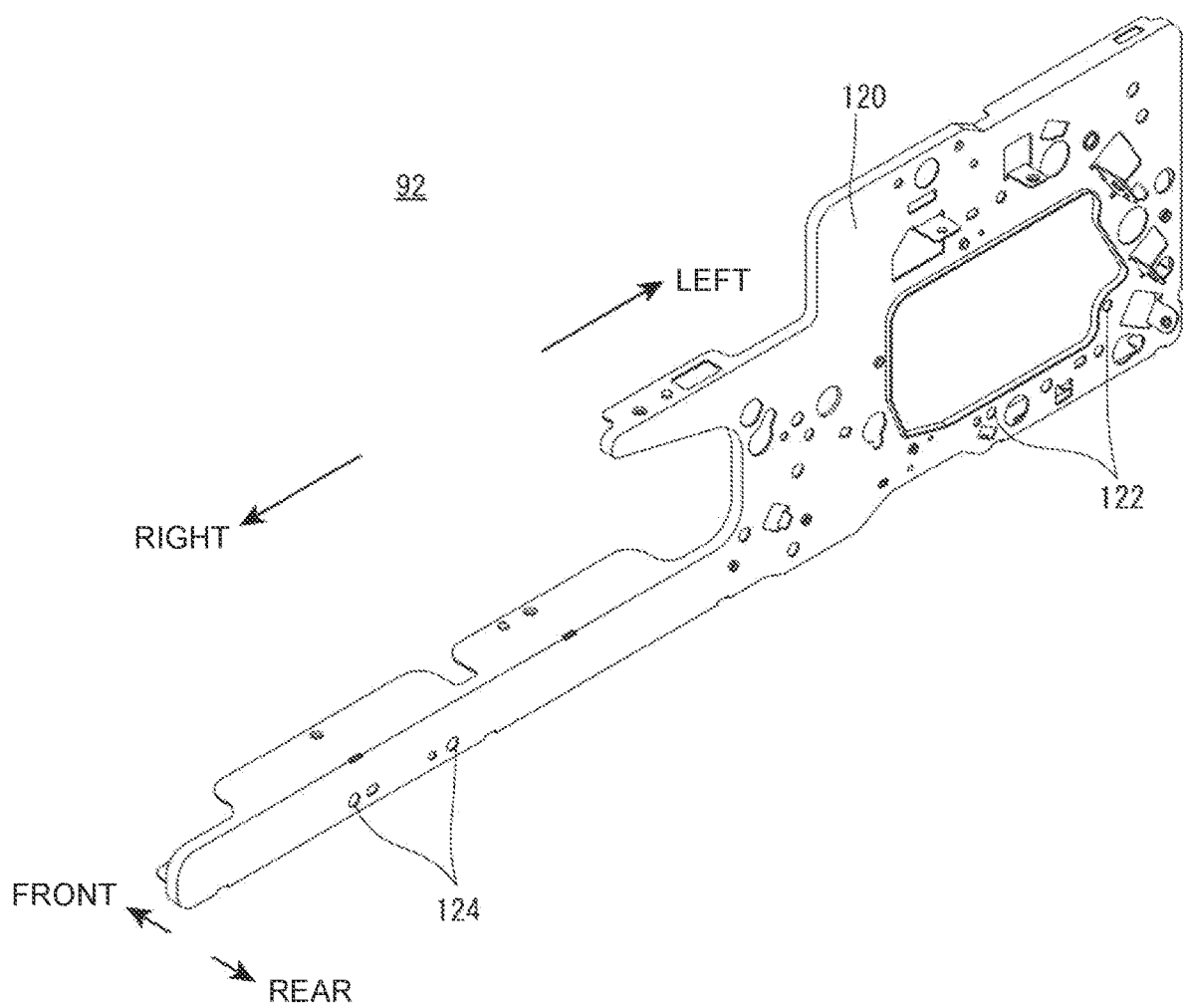
FIG. 7 is a perspective view of a front frame.

As illustrated in FIG. 7, the front frame 92 includes a longitudinal planar front frame body 120. Sixth fixing portions 122 are formed at the left end of the front frame body 120. The sixth fixing portions 122 are portions that are coupled to second coupling portions 142 of the left beam frame 94 with screw members and each has an insertion hole through which the screw member is inserted. Seventh fixing portions 124 are formed at the right end of the front frame body 120 to be coupled to the right beam frame 96. The front frame body 120 also has a fixing portion coupled to the upper left beam frame 98 and a bearing portion through which the shafts of the transport rollers 62 are inserted, as appropriate.

Figure 8:
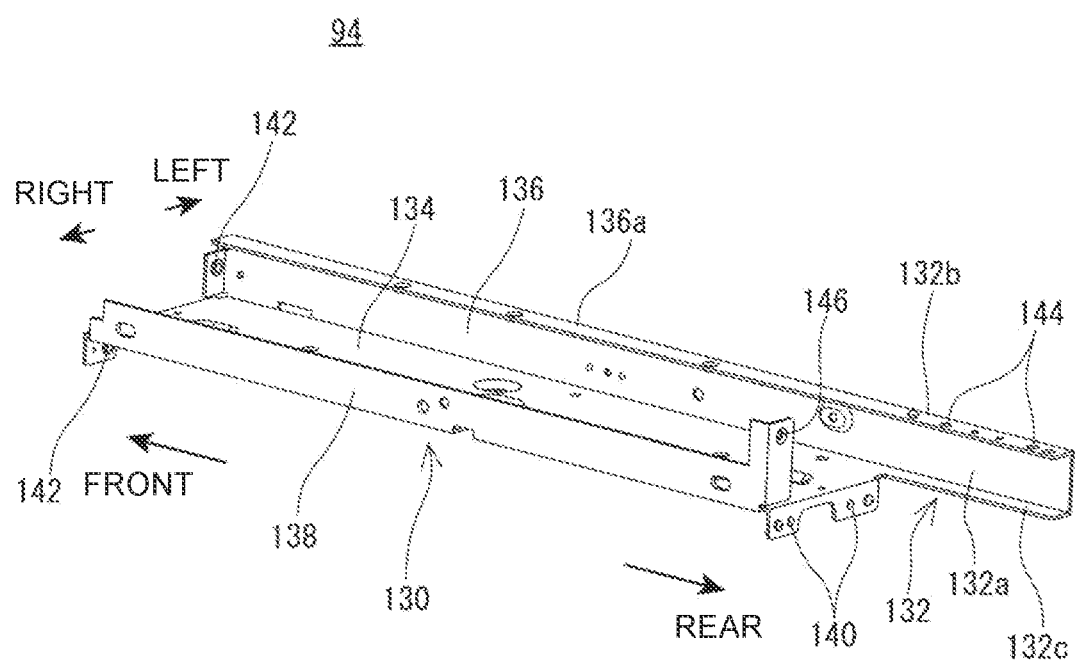
FIG. 8 is a perspective view of a left beam frame.

As illustrated in FIG. 8, the left beam frame 94 includes a beam body 130 that is bridged between the rear frame 90 and the front frame 92, and the extended portion 132 that extends from one end (rear end) of the beam body 130 to outside (rear side) of the rear frame 90.

The beam body 130 is a portion that defines the distance between the rear frame 90 and the front frame 92, and is formed to have an overall shape of a groove with an upper opening. Specifically, the beam body 130 has a rectangular plate-shaped bottom wall 134, a first longitudinal wall 136 that rises from one side edge (left side edge) of the bottom wall 134, and a second longitudinal wall 138 that rises from the other side edge (right side edge) of the bottom wall 134. The vertical directional length (protruding height from the bottom wall 134) of the first longitudinal wall 136 is the same over substantially the entire length in the longitudinal direction (front-back direction) of the first longitudinal wall 136, and a bent portion 136a bent toward the second longitudinal wall 138 (toward the right side) is formed at the upper edge of the first longitudinal wall 136. The vertical length of the first longitudinal wall 136 is set to be larger than the vertical length of the second longitudinal wall 138, for example, 16.8 mm.

The first coupling portions 140 and the fourth coupling portion 146 are formed at one end of the beam body 130. The first coupling portions 140 are portions coupled to the first fixing portions 106 of the rear frame 90 and each has a threaded hole to be screwed with a screw member. The fourth coupling portion 146 is a portion coupled to the second fixing portion 108 of the rear frame 90 and the third support portion 76f of the frame fixing member 76, and has a threaded hole to be screwed with a screw member. The second coupling portions 142 are formed at the other end (front end) of the beam body 130. The second coupling portions 142 are portions coupled to the sixth fixing portions 122 of the front frame 92 and each has a threaded hole to be screwed with a screw member.

The extended portion 132 has a substrate portion 132a, which in this example extends from one end of the first longitudinal wall 136 and is formed in the shape of a longitudinal plate. The vertical length of the extended portion 132 is set to be the same over substantially the entire length of the longitudinal direction and to be the same as the vertical length of the first longitudinal wall 136. That is, the first longitudinal wall 136 and the extended portion 132 are formed as continuous longitudinal plates having a constant vertical length over their entire lengths. The extended portion 132 having a longitudinal plate-shaped substrate portion 132a allows the bending strength (rigidity) of the extended portion 132 to be increased in the vertical direction. By forming the first longitudinal wall 136 and the extended portion 132 as longitudinal plates having a constant vertical length over substantially the entire length, the bending strength of the entire left beam frame 94 in the vertical direction can be increased.

A first bent portion 132b bent toward the right side is formed at the upper edge of the substrate portion 132a, and a second bent portion 132c bent toward the right side is formed at the lower edge of the substrate portion 132a. That is, the extended portion 132 is shaped as a groove opening toward the right side. The cross-sectional shape of the extended portion 132 is the same as the cross-sectional shape of the one side edge of the beam body 130 (the portion formed by the left-side edge of the bottom wall 134 and the first longitudinal wall 136). The extended portion 132 having the first bent portion 132b and the second bent portion 132c can increase the bending strength of the extended portion 132 in the vertical and left-right directions. By making the cross-sectional shape of the extended portion 132 the same as the cross-sectional shape of the one side edge of the beam body 130, the bending strength of the entire left beam frame 94 in the vertical and left-right directions can be increased.

Third coupling portions 144 are formed in the first bent portion 132h of the extended portion 132. The third coupling portions 144 are portions that are coupled to second support portions 76e of the frame fixing member 76 with screw members and each has an insertion hole through which the screw member is inserted.

The left hinge device 46 includes the frame fixing member 76 as described above. As illustrated in FIG. 4, the frame fixing member 76 has a rectangular plate-shaped top wall 76a and two side walls 76b and 76c extending downward from the two side edges (right side edge and left side edge) of the top wall 76a, that is, a right side wall 76b and a left side wall 76c, and is formed as a whole shape like a groove with a lower opening. The overall shape of the frame fixing member 76 is a groove opening downward.

Bent portions that are bent outward (toward right and left sides) are formed at the lower edges of the right side wall 76b and the left side wall 76c of the frame fixing member 76, and the first support portions 76d are formed on the bent portions. The first support portions 76d are portions coupled to the third fixing portions 112 formed on the oppositely extending portion 102 of the rear frame 90, and each has an insertion hole through which a screw member is inserted.

An L-shaped protruding portion that protrudes upward and then bends outward (toward the left side) is formed at the upper edge of the left side wall 76c. The second support portions 76e are formed in this protruding portion. The second support portions 76e are portions coupled to the third coupling portions 144 formed in the extended portion 132 of the left beam frame 94 and each has a threaded hole that engages with a screw member.

A protruding portion projecting upward is formed on the right side of the tip (front end) of the top wall 76a, and the third support portion 76f is formed on the protruding portion. The third support portion 76f is a portion coupled to the second fixing portion 108 of the rear frame 90 and the fourth coupling portion 146 of the left beam frame 94, and has an insertion hole through which the screw member is inserted.

Figure 9:
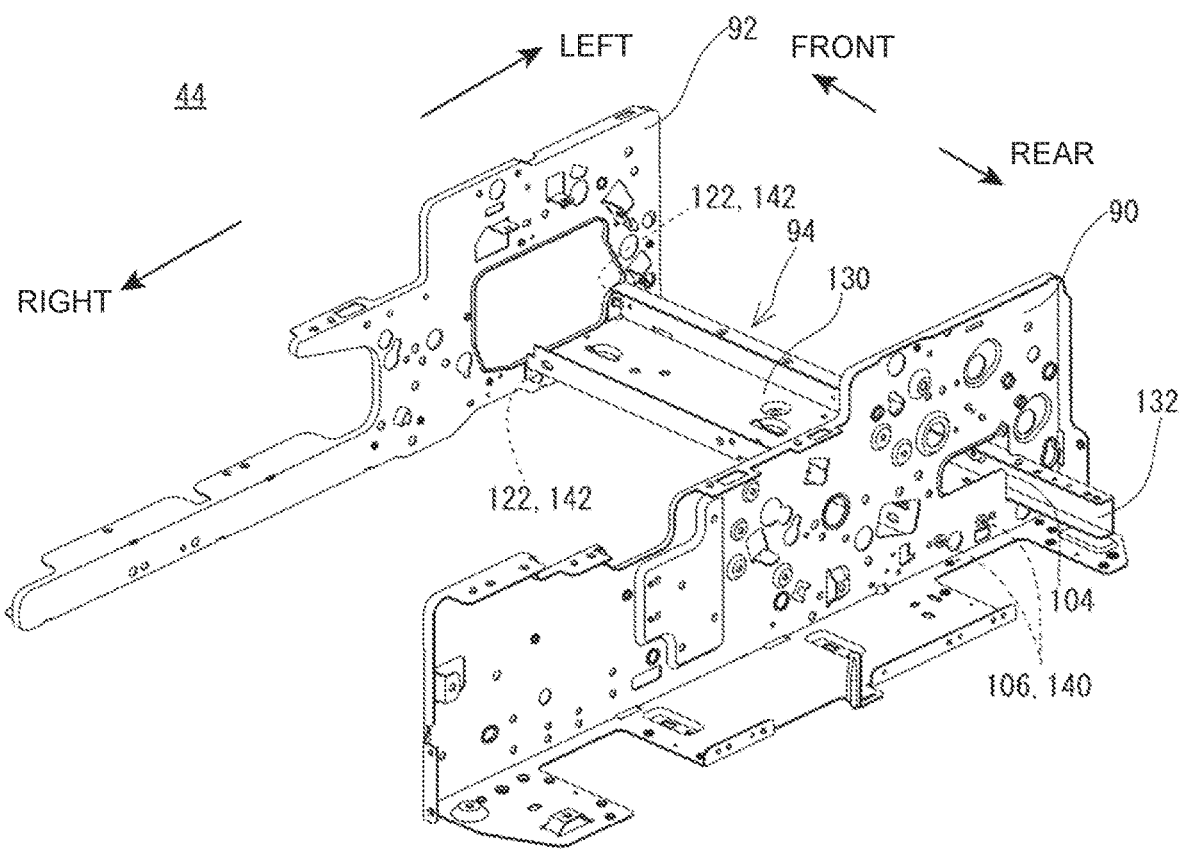
FIG. 9 is a perspective view of the mounting structure of the left beam frame to the rear frame and the front frame.

In assembling each member as described above, first, the first fixing portions 106 of the rear frame 90 and the first coupling portions 140 of the left beam frame 94 are coupled (fastened) with screw members, and the sixth fixing portions 122 of the front frame 92 and the second coupling portions 142 of the left beam frame 94 are coupled, as illustrated in. FIG. 9. In this case, the extended portion 132 of the left beam frame 94 is inserted into the first insertion portion 104 of the rear frame 90, and the extended portion 132 protrudes from the rear face of the rear frame 90.

Figure 10:
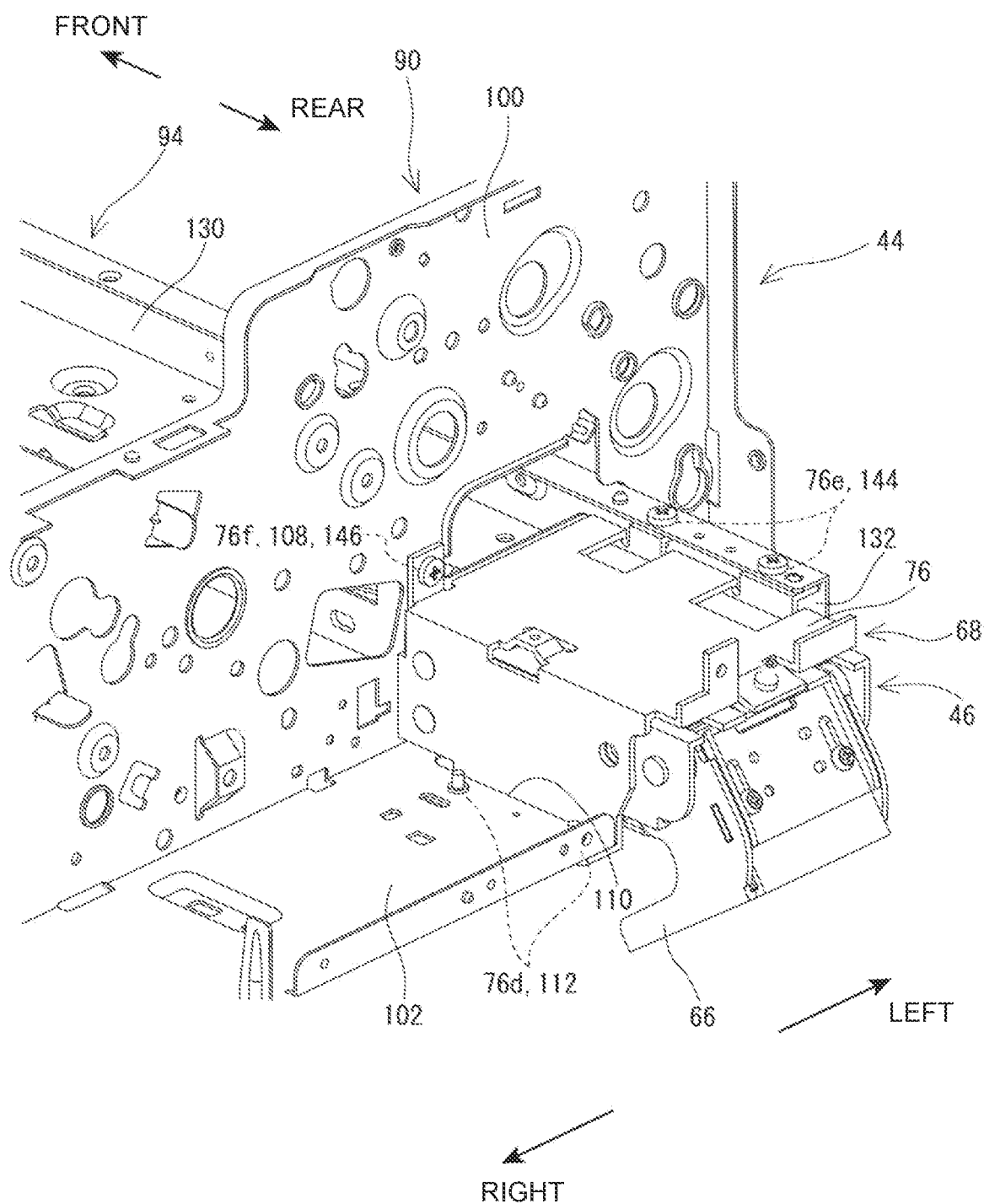
FIG. 10 is a first perspective view of the hinge device of the image reading device and its vicinity.
Figure 11:
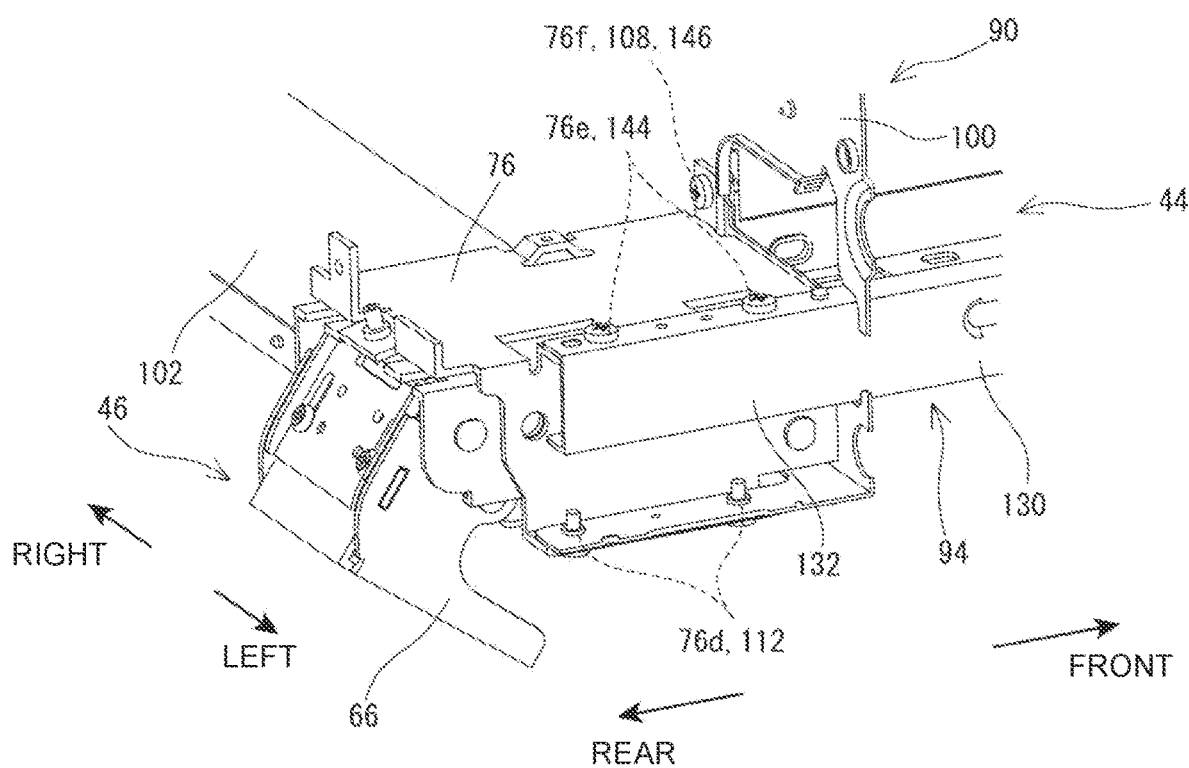
FIG. 11 is a second perspective view of the hinge device of the image reading device and its vicinity.

Then, the frame fixing member 76 of the left hinge device 46 is inserted (fitted) into the second insertion portion 110 of the rear frame 90, and the third fixing portions 112 of the rear frame 90 and the first support portions 76d of the frame fixing member 76 are coupled with screw members, as illustrated in FIGS. 10 and 11. The third coupling portions 144 of the extended portion 132 are coupled to the second support portions 76e of the frame fixing member 76 with screw members. In this case, the first support portions 76d and the second support portions 76e of the frame fixing member 76 are positioned below the respective third fixing portions 112 of the rear frame 90 and the respective third coupling portions 144 of the extended portion 132. In other words, the first support portions 76d and the second support portions 76e support the third fixing portions 112 and the third coupling portions 144 from the lower side. As a result, even if an urging force in the direction in which the document feeder 44 opens (upward) acts on the coupling portions, the load applied to the screw members is reduced, and damage to the coupling portion is prevented.

The second fixing portion 108 of the rear frame 90, the fourth coupling portion 146 of the left beam frame 94, and the third support portion 76f of the frame fixing member 76 are coupled with a screw member while the second fixing portion 108 is sandwiched between the fourth coupling portion 146 and the third support portion 76f. As a result, the rear frame 90, the left beam frame 94, and the frame fixing member 76 are more firmly integrated, and thereby the rigidity of this entire mounting structure is increased.

Figure 12:
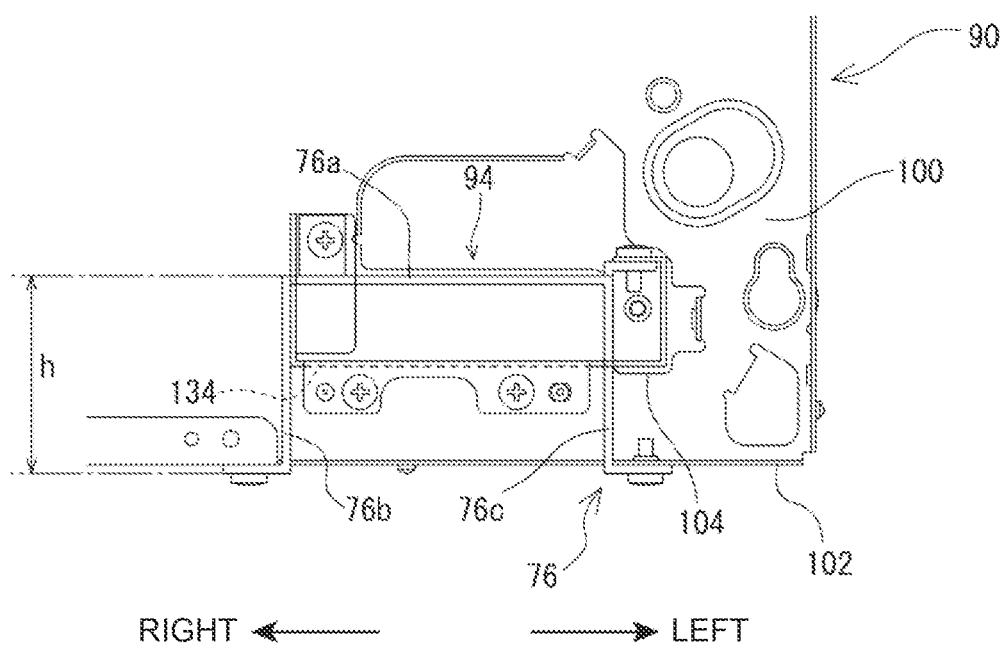
FIG. 12 is a rear view of the hinge device of the image reading device and its vicinity.

In the first embodiment, the beam body 130 of the left beam frame 94 is formed in an upper opening groove shape (upward U-shape), and the frame fixing member 76 is formed in a lower opening groove shape (downward U-shape), as illustrated in FIGS. 11 and 12. Since the rear frame 90 is sandwiched and fixed between the grooved beam body 130 and the grooved frame fixing member 76, which face each other in opposite directions, the bending strength of the coupling portion in the vertical direction can be increased. In the first embodiment, the bottom wall 134 of the beam body 130 is disposed within the height range h of the side walls 76b and 76c of the frame fixing member 76. This makes it possible to increase the bending strength of the coupling portion in the vertical direction.

Figure 13:
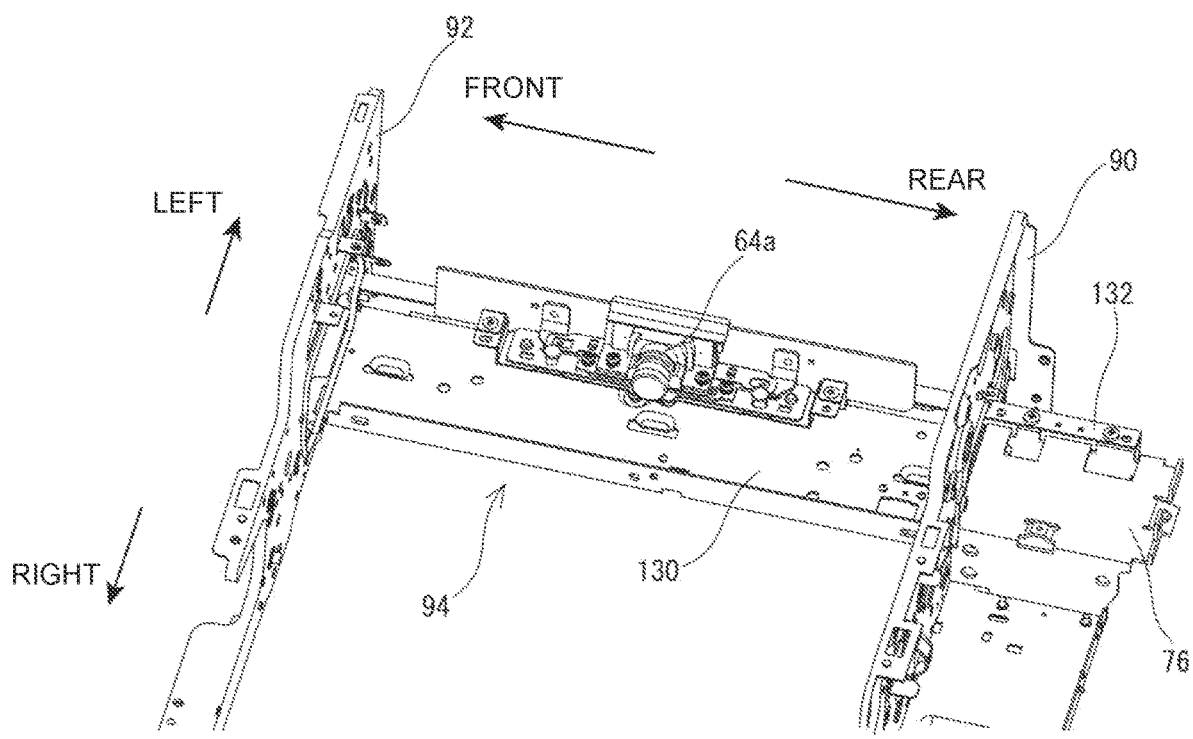
FIG. 13 is a perspective view of a reading sensor disposed on the left beam frame.

In the first embodiment, the reacting sensor 64a of the second image reader 64 is disposed on the beam body 130 of the left beam frame 94, as illustrated in FIG. 13. This eliminates the need for a separate fixing frame for fixing the reading sensor 64a, and allows the weight of the document feeder 44 to be reduced.

As described above, according to the first embodiment, the extended portion 132 is formed in the left beam frame 94 that fixes the rear frame 90 and the front frame 92 at a predetermined interval, and the extended portion 132 is fixed to the turning member 68 of the left hinge device 46. This allows the urging force of the urging mechanism 72 to act similarly on both the rear frame 90 and the front frame 92, thereby increasing the frame rigidity and appropriately preventing distortion between the rear frame 90 and the front frame 92. Accordingly, the parallelism of the transport rollers 62 can be maintained with a simple configuration, and the skewed feeding of the document in the document feeder 44 can be appropriately prevented.

Since there is no need to increase the number of beam frames or to enlarge the beam frames in order to increase the connection strength (mounting rigidity) between the rear frame 90 and the front frame 92, the weight and size of the document feeder 44, as well as the increase in manufacturing cost can be effectively suppressed.

Since the extended portion 132 is formed in the left beam frame 94 that fixes the rear frame 90 and the front frame 92 at a predetermined interval at the end adjacent to the transport rollers 62, distortion of the portions of the rear frame 90 and the front frame 92 that hold the transport rollers 62 can be effectively suppressed, and the parallelism of the transport rollers 62 can be more appropriately maintained.

Second Embodiment

The image reading device 14 according to the second embodiment of the present invention will now be described. In the second embodiment, the configuration of the right beam frame 96 differs from that of the first embodiment described above. Since other parts are the same, descriptions that overlap with the first embodiment described above are omitted or simplified.

Although not illustrated, in the second embodiment, an extended portion is formed in the right beam frame 96 in addition to that is the left beam frame 94, and this extended portion is coupled (fixed) to a frame fixing member of the right hinge device. As the extended portion of the right beam frame 96 and the frame fixing member of the right hinge device, those having the same configuration as those of the left, beam frame 94 and the left hinge device 46 may be employed.

According to the second embodiment, the distortion between the rear frame 90 and the front frame 92 can be prevented more reliably because the extended portions are formed on both the left beam frame 94 and the right beam frame, and these are fixed to the respective turning members of the left hinge device and the right hinge device. Accordingly, the parallelism of the transport rollers 62 can be maintained more reliably, and the skewed feeding of the document in the document feeder 44 can be more appropriately prevented.

Note that in the above-described embodiments, the hinge devices are disposed at the two ends of the image reading device in the left-right direction (that is, the document feeder is supported at two positions on the left and right by two hinge devices), but the number and position of the hinge devices may be appropriately changed. It is also possible to appropriately change which hinge device is to be coupled to the extended portion of the beam frame.

The specific configurations of the image forming apparatus described above are merely examples and can be appropriately changed according to the actual product specifications. The image forming apparatus may be a monochrome machine that forms a monochromatic image on a recording medium, and its image former may include an inkjet printer or the like in place of a laser printer.

The image reading device according to the present invention may be used as an individual product as a stand-alone device), The document feeder need not necessarily include an image reader.

The specific numerical values, component shapes, etc., described above are mere examples, and can be appropriately modified if required by product specifications.

What is claimed is:

1. An image reading device comprising:
    a reading device body including an image reader; and
    a document feeder turnably attached to an upper side of the reading device body with a hinge device, wherein,
    the document feeder comprises:
        a plurality of transport rollers disposed in a document transport path;
        a planar first side frame that rotatably supports one end of the transport rollers;
        a planar second side frame disposed parallel to the first side frame and rotatably supports the other end of the transport rollers; and
        a beam frame disposed at a position corresponding to the hinge device to fix the first side frame and the second side frame at a predetermined interval,
    the hinge device comprises:
        a fixed member fixed to the reading device body;
        a turning member turnably coupled to the fixed member around a support shaft and coupled to the first side frame to support the document feeder; and
        an urging mechanism that exerts an urging force to the fixed member in a direction of opening of the turning member, and
    the beam frame comprises:
        a beam body having a first coupling portion and a second coupling portion, the first coupling portion being coupled to the first side frame, the second coupling portion being coupled to the second side frame, the beam body being bridged between the first side frame and the second side frame;
        an extended portion that extends from one end of the beam body to outside of the first side frame; and
        a third coupling portion formed in the extended portion and coupled to the turning member.

2. The image reading device according to claim 1, wherein,
    the beam body has a bottom wall and a first longitudinal wall rising from one side edge of the bottom wall, and
    the extended portion extends from one end of the first longitudinal wall.

3. The image reading device according to claim 2, wherein,
    a vertical length of the first longitudinal wall is the same over substantially the entire length in a longitudinal direction, and
    a vertical length of the extended portion is the same as the vertical length of the first longitudinal wall over substantially the entire length in a longitudinal direction.

4. The image reading device according to claim 1, wherein,
    the turning member comprises:
        a holding member that holds the urging mechanism; and
        a frame fixing member that is attached to an outer face of the holding member,
    the first side frame comprises:
        a longitudinal plate-shaped first side frame body having a first insertion portion through which the extended portion is inserted; and
        a transverse plate-shaped oppositely extending portion extending outward from a lower end of the first side frame body and having a second insertion portion through which the frame fixing member is inserted, and
    the frame fixing member is fixed to the third coupling portion and the oppositely extending portion.

5. The image reading device according to claim 4, wherein,
    the beam body has a bottom wall, a first longitudinal wall rising from one side edge of the bottom wall, and a second longitudinal wall rising from the other side edge of the bottom wall,
    the frame fixing member has a top wall and two side walls extending downward from two side edges of the top wall,
    the bottom wall of the beam body is disposed within a height range of the two side walls of the frame fixing member, and
    the first side frame body is sandwiched and fixed between the beam body and the frame fixing member.

6. The image reading device according to claim 1, wherein the beam frame is disposed at an end adjacent to the transport rollers in a longitudinal direction of the first side frame.

7. The image reading device according to claim 1, wherein,
    the document feeder comprises a second image reader, and
    a reading sensor of the second image reader is fixed on the beam body.

8. An image forming apparatus comprising:
    the image reading device according to claim 1.

* * * * *